May 31, 1932. P. STEIMEL 1,861,147
AUTOMATIC SACKING BALANCE WITH A CONVEYING AND A PACKING MECHANISM
Filed May 10, 1928 7 Sheets-Sheet 1

Fig. 1.

Peter Steimel
INVENTOR;

his Attorney.

May 31, 1932.  P. STEIMEL  1,861,147
AUTOMATIC SACKING BALANCE WITH A CONVEYING AND A PACKING MECHANISM
Filed May 10, 1928   7 Sheets-Sheet 2

Fig. 2.

Peter Steimel
INVENTOR:
By
his Attorney

May 31, 1932. P. STEIMEL 1,861,147
AUTOMATIC SACKING BALANCE WITH A CONVEYING AND A PACKING MECHANISM
Filed May 10, 1928 7 Sheets-Sheet 3

Fig.3.

Peter Steimel
INVENTOR;
By
his Attorney.

May 31, 1932. P. STEIMEL 1,861,147
AUTOMATIC SACKING BALANCE WITH A CONVEYING AND A PACKING MECHANISM
Filed May 10, 1928 7 Sheets-Sheet 4

Peter Steimel
INVENTOR;
his Attorney.

May 31, 1932. P. STEIMEL 1,861,147
AUTOMATIC SACKING BALANCE WITH A CONVEYING AND A PACKING MECHANISM
Filed May 10, 1928 7 Sheets-Sheet 5

Peter Steimel
INVENTOR
BY
ATTORNEY

May 31, 1932. P. STEIMEL 1,861,147
AUTOMATIC SACKING BALANCE WITH A CONVEYING AND A PACKING MECHANISM
Filed May 10, 1928 7 Sheets-Sheet 6

Peter Steimel
INVENTOR
BY
his ATTORNEY.

May 31, 1932.   P. STEIMEL   1,861,147
AUTOMATIC SACKING BALANCE WITH A CONVEYING AND A PACKING MECHANISM
Filed May 10, 1928   7 Sheets-Sheet 7

Peter Steimel
INVENTOR
BY
his ATTORNEY

Patented May 31, 1932

1,861,147

UNITED STATES PATENT OFFICE

PETER STEIMEL, OF HENNEF-SIEG, GERMANY

AUTOMATIC SACKING BALANCE WITH A CONVEYING AND A PACKING MECHANISM

Application filed May 10, 1928, Serial No. 276,789, and in Germany June 16, 1924.

This invention relates to instrumentalities for weighing-goods, before running the same into the inlet of the conveying-mechanism, and consists in a mechanism for first filling a receptacle which, at the lower end, is provided with a closing-trap. Only after this receptacle has been completely filled are the goods to be weighed run through a second passage onto the conveyor and are brought by the latter into the balance-inlet. The closing trap of the receptacle is connected to the closing-trap of the balance-inlet which, just before the weighing is finished, reduces the greater supply flow to a thin stream, in such manner, that, when the balance-trap closes, the receptacle trap opens, and, vice-versa, and further when at the beginning of a new weighing procedure, the balance trap opens, the receptacle-trap closes. At the beginning of the weighing operation the attendant opens the balance-trap by a handle. By this movement he closes the trap of the receptacle, as described above. Consequently the arriving material to be weighed fills first the latter and then runs through the second passage onto the conveying-mechanism by which it is transported into the balance-inlet. Just before getting to its equilibrium, the balance drops a little and thus closes the inner inlet-trap. Consequently the trap of the receptacle opens and lets the material pass through, which has been stored in it, onto the conveyor which transports it also into the balance-inlet. The purpose of this mechanism is to supply the balance even then with the material, which is necessary for the thin inlet-stream, when the main-flow becomes only quite weak, and thus the weighing would be incorrect. As the material to be weighed, when running into the sack, which hangs at the balance, is filling it only loosely, it mounts up into the sack-connecting-piece and would pass over the rim of the sack, when the latter is removed by the attendant. Consequently the balance has been provided with a packing-mechanism which, by means of some beaters placed on the side of the sack, forces, by shaking and turning it, the flour in the connecting-piece to pack down into the sack. In order to start the packing mechanism at the end of the weighing, the attendant lifts, at the beginning or during the weighing a counterweight and suspends it by a dog. At the end of the weighing the balance disengages this counterweight, which in turn engages a coupling which connects the packing-mechanism to the driving-gear so that the packing mechanism is started, and the shaking of the sack begins. In order to avoid any injurious influence of this shaking on the balance, the latter is lifted, at the falling down of the counterweight and thus becomes immobilized. Consequently the balance itself is not influenced by the shaking. The counterweight presses this immobilizing-mechanism as far as behind a supporter. In order to disengage the latter at the right moment and to stop again the packing-mechanism, a system of wheels is placed at the balance-frame which is also engaged by the falling counterweight and driven by the beam driving the packing mechanism. This system of wheels lifts by a uniform movement a lifting rod, the latter having reached its highest point, it disengages the supporter which kept the packing mechanism in action. Consequently the packing mechanism is stopped by the disengagement of the coupling, and the balance is freed from the ratchet. The balance remains however at its highest position, because it is kept there by a dog.

The above mentioned barring of the sack-connecting-piece in its highest position, must be suspended, when the filling of the sack begins. This is done at the same time, as the inlet-trap opens.

It is important that the packing arms, when being disengaged are in such position that not one of them touches the sack, that is to say, in a medium position. For this purpose the centre of gravity of the eccentric pulley, which causes the to-and fro-movement of the packing mechanism, has been placed outside the axis of rotation. When the packing mechanism stops, the centre of gravity of the pulley always goes to the bottom, and at this position of the centre of gravity the packing arms are in their medium position. Consequently not one of them touches the sack.

In order to be in a position of having the packing mechanism pack some sacks of a different width and length, the beating plates which are beating the sacks, are variable with regard to their height and their distance from one another.

In order to intensify the packing-action and to abbreviate its duration, there are, besides the two lateral beaters, provided at the lower end of the balance frame, two blocking plates which are mutually cooperating with the packing arms in such manner, that when the right packing arm beats the sack the latter swings against the blocking plate which is placed at the left side of the frame and, vice versa, and further when the left packing arms engage the sack, the latter is thrown against the blocking-plate of the right side.

The present invention consists of the combination and arrangement of parts hereinafter described in the specification, set forth in the claims and illustratively exemplified in the accompanying drawings, in which, Figure 8 is an elevational view of the invention showing the balance and the locking means for the traps. Figure 8ª is a substantially longitudinal sectional view of the feed and weighing mechanism.

Figure 1:
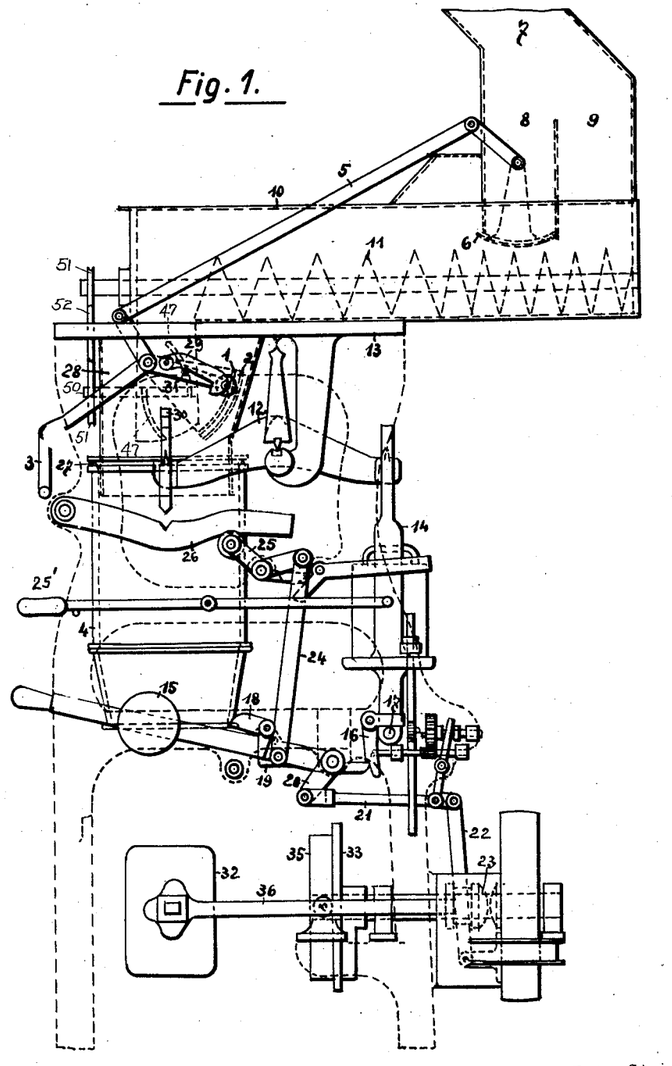
Figure 1 is an elevational view of the invention showing the balance in working position.

Fig. 1 shows the balance in the working-position. The two inlet traps 1 and 2 have been opened by the handle 3 and the material being weighed is running in a large flow through the sack-connecting piece 4 into the sack hanging from the latter. Movement of the inner inlet-trap 1 has closed a trap 6 of the supplying receptacle 8 by means of a connecting rod 5. Consequently the material which arrives through the inlet pipe 7 fills first the receptacle 8 and runs then through the gap 9 into the conveying mechanism 10 which consists of a conveyor. The sack-connecting-piece 4 is hung up at the knife-edges of the balance beam 12 which rests in some truss-pieces of the supporting plate 13.

Figure 2:
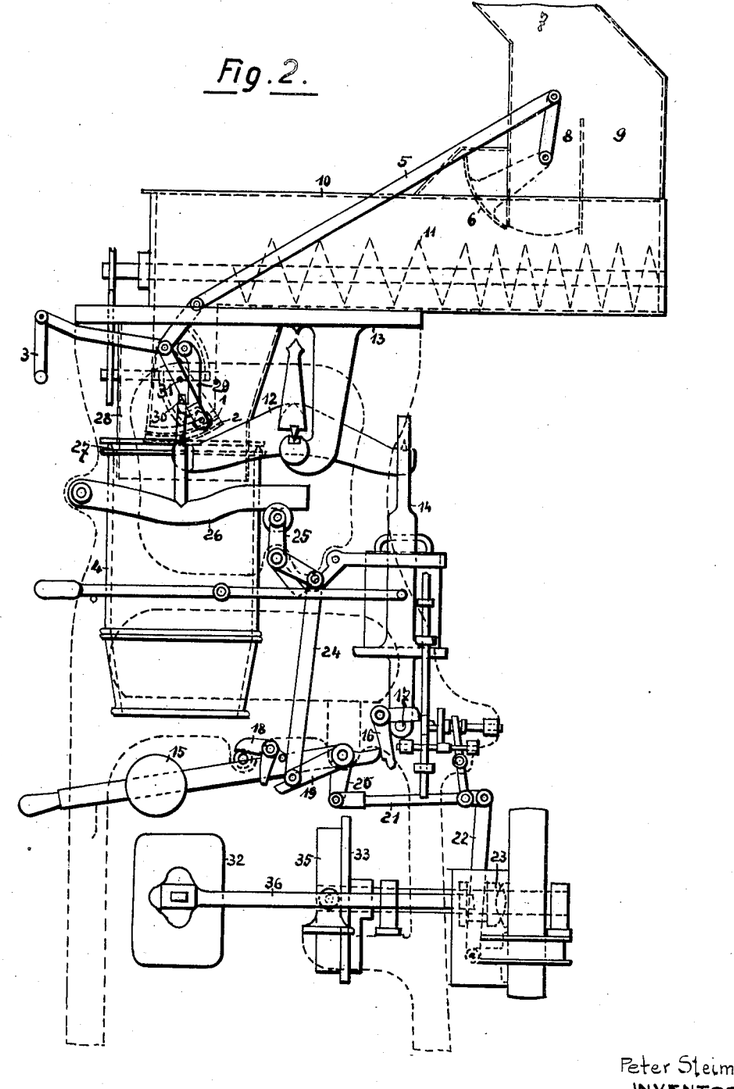
Figure 2 is a similar view showing the inlet traps in closed position.
Figure 3:
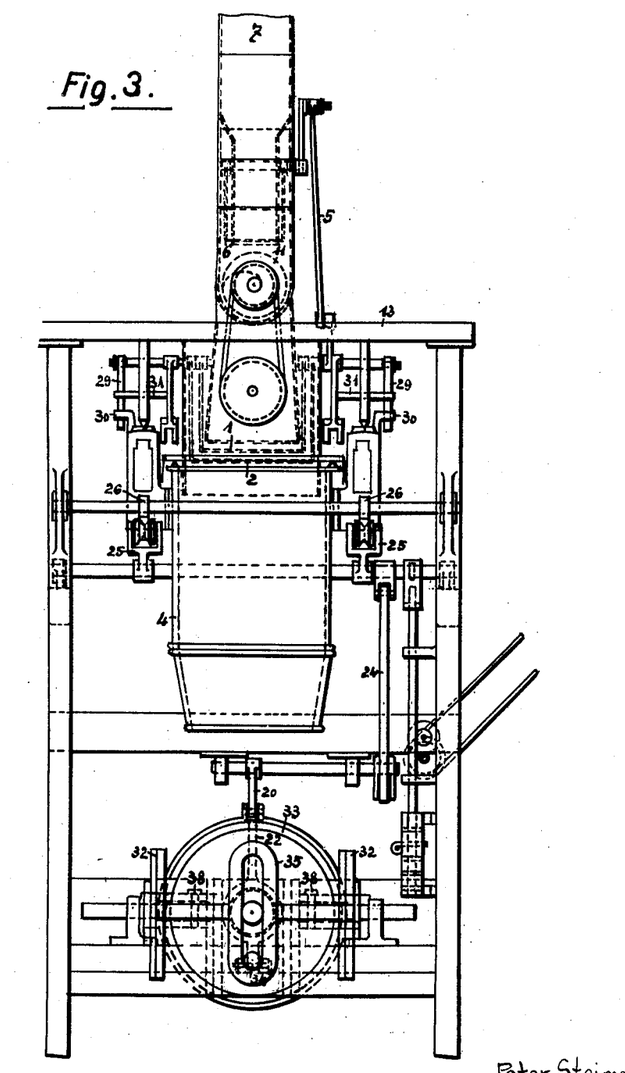
Figure 3 is an end elevational view of the machine.
Figures 8, 8A:
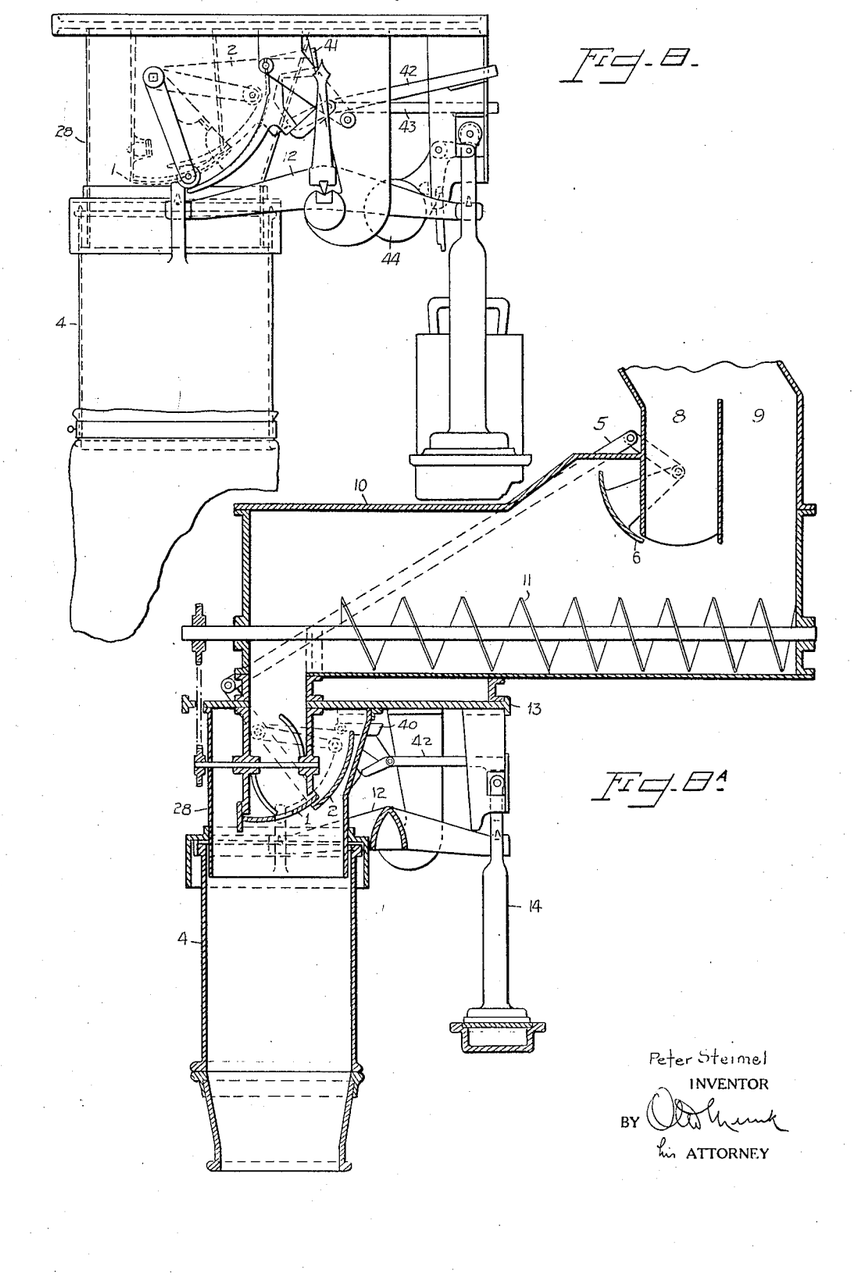

At the other end of the balance-beam hangs the scale 14 with the weights. After nearly all the material has run in, the inlet trap 1 is disengaged by a lever which is governed by the balance, so that it falls back to its closing position. Consequently the trap 6 of the supplying receptacle 8 is opened by means of the connecting rod 5 and permits the escape of the material stored in the receptacle, into the conveying-mechanism 11. Consequently this material is employed for the fine weighing which has begun now and during which the material is running through a small opening placed in the trap 1. As soon as the scales have come to a balance, the trap 2 is also disengaged. It closes off the flow of the material completely. The weighing procedure is then finished. As however the material has run only loosely into the sack, it fills the latter as well as a part of the sack-connecting-piece 4. The two closure traps 1 and 2 are firmly latched to the two releasing levers 40 and 41, see Figure 8, which are supported by the two supporting levers 42 and 43. Shortly before equilibrium is attained the scale descends slightly by the action of the weight lever 44 and raises the supporting lever 42 slightly, the lever 42 releasing the inner trap to close the latter. Correction in the weight is effected at the moment of equilibrium, the scale swinging further and raising the supporting lever 43 so that the second inlet trap 2 also drops to closed position. Before taking off the sack, the material in the connecting piece 4 must be put into the sack. For this purpose a packing mechanism has been provided which consists of a rotary shaft having a crank-plate 33 which drives the beaters disposed at opposite sides of the sack, in a to- and fro-movement. This packing mechanism is effective at the end of the weighing operation by means of the counter weight 15 which is lifted up and suspended by a dog 16 in control of the attendant, at the beginning or during the weighing operation. At the scale 14 is fixed a disengaging pin 17 which disengages the dog 16 as soon as the weighing operation is finished. The counter weight 15 then falls downwardly, and by means of a second dog 18 it releases the levers 19, 20, 21 and 22, the latter thereof engaging a coupling 23 so that the packing mechanism starts working. In order to protect the balance from the shocks of the packing operation, the lever 19 is combined with a connecting rod 24 which, by means of a rolling forked bent lever 25 lifts the arms 26. Consequently the sack-connecting-piece is pushed into its highest position and held there by the pins 27 which enter into the centre-punches placed in a flange of the dust box 2. At the end of the packing action of the balance this stop is suspended by a handlever 25¹ which turns on an axle tree in such a way that the disengagement of the latter, the roll levers 25 are pushed aside and the arms 26 are lowered, while the sack connecting piece 4 is being freed. Now the sack which has been packed is taken off. In order to make it impossible that the strong vibrations which are caused by the packing (filling) of the filled bag are not transferred to the scale, in this way injuring the sensitive parts of same, the bag filling conduit together with the filled bag is pressed upward and is held fast against the edge of the dust box leaving a small clearance. This action of the scale becomes automatic as soon as the weighing is terminated and the packing operation is to start. This is effected in the manner that by the scale, the weight 15 is released, the toggle lever 16 being moved off away from its supporting arm by the weighing pan (plate). This weight 15 upon its dropping down also carries along downward, the arm 19 by means of the toggle lever 18; the arm 19 drags with it connecting rod 24 and rotates the roller forks 25 from the position shown in Figure 1 into the position shown in Figure 2. These roller forks are arranged on its axis on both sides of the bag filling conduit as shown in Figure 3. The roller forks 25 rest upwards, the arms 26 resting on their rollers (Figure 2) and in this way press the bag filling conduit against the edge of the dust box 28, leaving only a very small clearance at 27, through which any possible dust can escape. In order to avoid any back lash of the balance whereby the mechanism thereof would suffer, there has been provided means whereby it is kept back at its highest position even after the arms have been lowered. This is done by swinging parallel hooks 29 disposed to engage pegs 30 (Fig. 2) fixed on the sack connecting piece. These hooks are removable so that after an empty sack has been hung up, on the sack connecting-piece, the two inlet traps 1 and 2 are opened again, by pulling the handle 3, and the pins 31 engage the traps 1 and 2 to push the hooks 29 aside. It is important that the beaters 32 of the packing mechanism, at the moment when the latter is stopped, are in a position that not one of them touches the sack, so that the latter can swing freely. For this purpose the pulley 33 which with the roller 34 (Fig. 3) and the slot hole 35 moves the packing arms 36 and therewith the beaters 32 to and fro, is thicker on one side, so that the centre of gravity is situated eccentrically whereby when at a stillstand, its centre of gravity nearly always goes down, giving to the roller 34 such a position on the pulley that, when its centre of gravity is at its nethermost point, the beaters 32 are in a medium position.

Figures 4, 5:
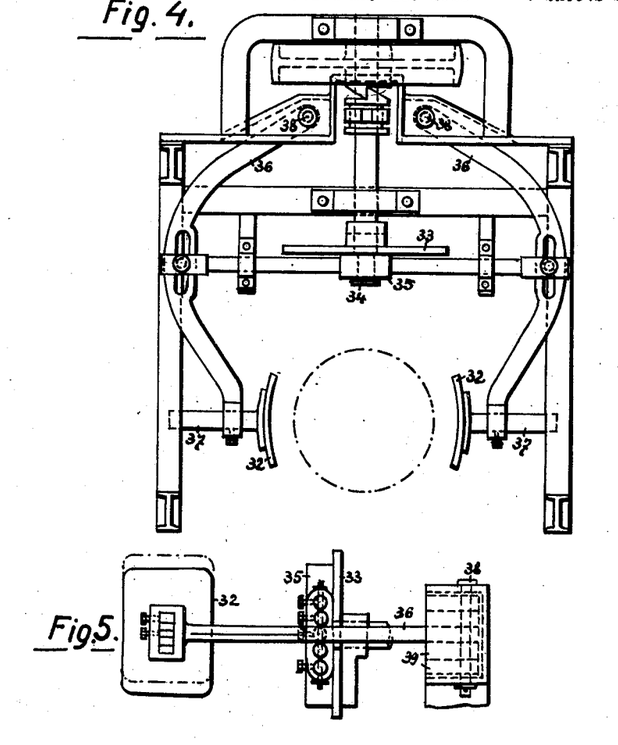
Figure 4 is a plan elevational view of the sack packing mechanism.
Figure 5 is a detail side view of one of the beaters.

The width and length of the sacks which are to be filled, are different according to the weight and quantity of the material. Consequently the packing arms must also be regulated with regard to the height as well as to the width. For this purpose the beaters 32 are fixed on the stud bars 37 which are movable in the packing arms 36 (Fig. 4), the studs 37 being adjustable vertically in the bearings disposed midway of arms 36 (Fig. 5). The height may be regulated in the way shown, for instance in Fig. 5, the axis of revolution 38 of the packing arms 36 is provided with various members 39. According to the length of the sacks, the packing arms must be set higher or lower.

Figure 6:
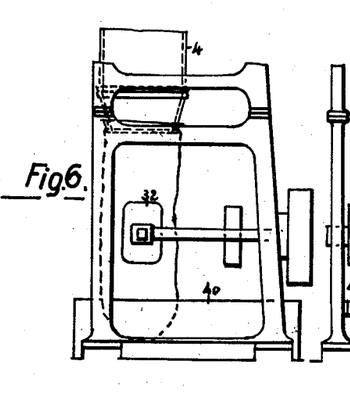
Figures 6 and 7, respectively, are side and front elevational views of the sack packing mechanism and associated parts.
Figure 7:
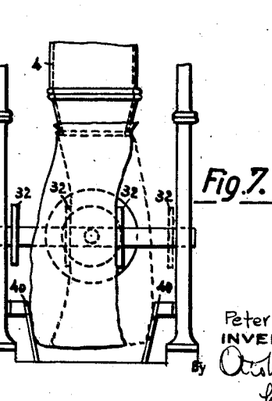

In order to intensify the packing action of the beaters 32 there are provided, besides same—as shown in Figs. 6 and 7—some blocking plates 40 at the right and left side, near the lower end of the sacks. Against these blocking plates the sack mutually abuts when it is pushed by the beaters 32.

Spiral blades or stirrers 47 for loosening up the material are mounted in the upper portion of the dust box 28, which blades tend to push the material always in the direction of the mid portion of the inlet. The blades 47 are carried on a shaft 50 which receives its rotary motion from a pair of pulleys 51, one thereof being mounted on the shaft 50, while the other is disposed at the end of the conveyor shaft, both pulleys being connected by a belt 52.

The duration of movement of the paddles or beaters 32 is predetermined by a timing mechanism, illustratively exemplified in Figures 1, 2 and 9 to 11, which comprises an upright toothed rod or rack 75 supported in upper and lower bearings, the upper thereof being disposed on an elevation above the weight platform 14 of the scale. The upper end of the rod 75 accommodates a stop or collar 81 which may be adjusted along the rod for the purpose hereinafter described. A pinion 79 is in mesh with the rack 75 and is mounted on a shaft supported in bearings fixed on the frame of the apparatus. The pinion 79 is also provided on one face adjacent its hub with a lug 78 projecting axially thereof, the latter being adapted to be engaged by a similar lug 78' arranged at the side of a spur gear 76 loosely mounted on the shaft and capable of axial as well as rotary movement thereof. The side of the gear 76 opposite to that having the lug 78' is provided with a grooved collar to receive the forked end of a lever 80 which is pivotally mounted substantially midway of its length and provided with a pin at its opposite end projecting into an elongated slot in a portion of the link 21 adjacent its pivotal connection with the link 22. The spur gear 76 is driven by means of a pinion gear 76' turning with a shaft 76' having a pulley 77 at its outer end to accommodate a belt connection with the paddle operating drive connection 23.

In operation the timing device functions as follows: The lever system has been set in motion by the upward movement of the pin carried by the weight platform 14 as the balance finds its level under the weight of the material accumulated in a container on the scales. As explained before the paddles do not operate against the sack until the scale has been locked against shock arm 26. Simultaneously with the arm 26 having moved into position to fix the scale beam 12, the lever 21 has caused the arm 80 to shift the spur gear and bring the lugs 78 into engagement. This starts the pinion 79 in motion to elevate the rod 75, the duration of this upward movement thereof being determined by the position of the stop 81 with respect to the upper bearing for the rod, i. e., the further down on the rod the stop is placed the higher the upper end of the rod will project towards a portion of the lever system 25. When the rod 75 engages the lever system 25 the latter is moved to a position which releases the lock on the balance. This movement of the lever system 25 is transmitted through link 24, rocker arm 20 and links 21 and 22 to disconnect the clutch 23 of the paddle drive shaft. Simultaneously with the movement of the link 21, the arm 80 is shifted to disconnect the lugs 78 and the rod 75 is released and drops to its initial position.

Figure 12:
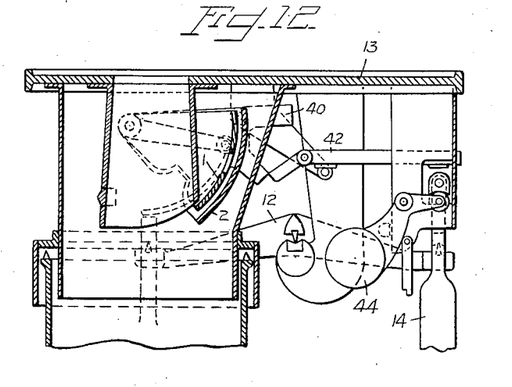
Figures 12, 13 and 14 are substantially longitudinal sectional views of the scale and bucket mechanism showing the same three different stages of the operation.
Figure 13:
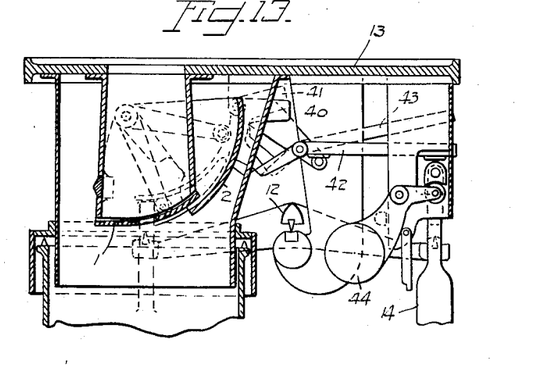
Figure 14:
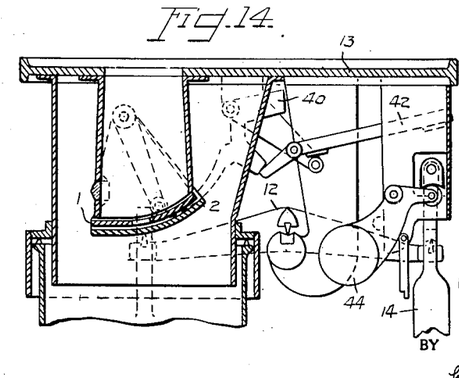

In Figures 12, 13 and 14, the scale bucket mechanism is shown in detail.

Figure 9:
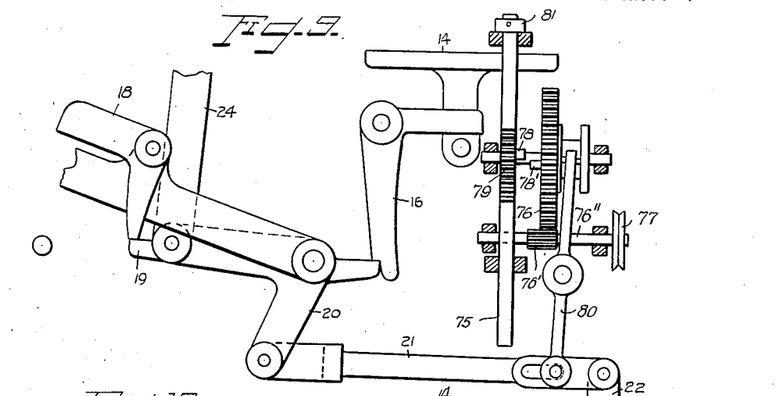
Figure 9 is an elevational view of the timing mechanism.

In Figure 9, both traps 1 and 2 are open so that material to be weighed flows in full stream into the bag.

Figures 10, 11:
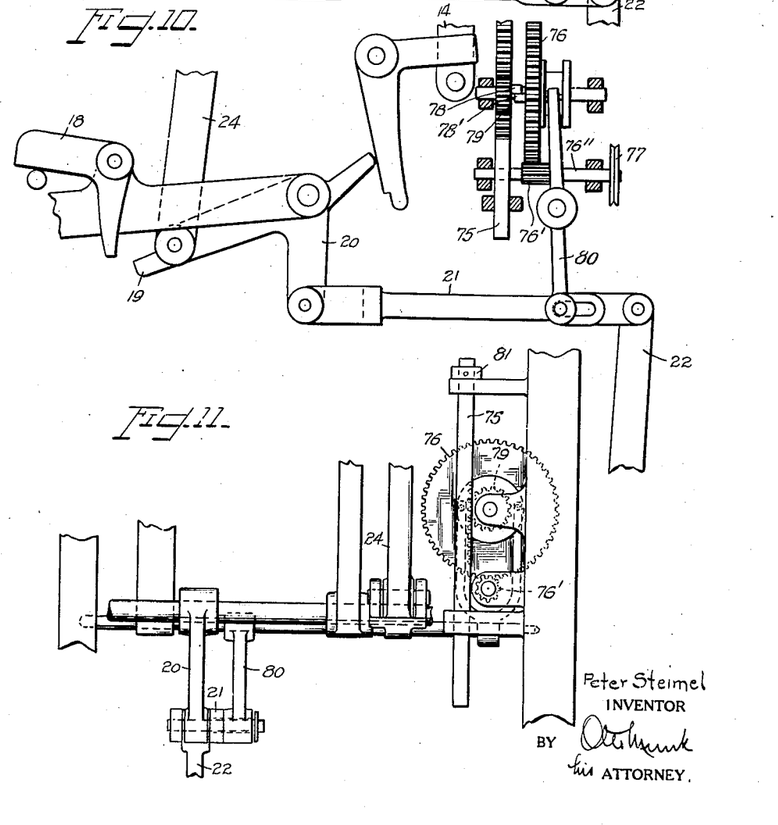
Figure 10 is a similar view of the parts in raised position.
Figure 11 is a side elevational view of the same.

Figure 10 shows the traps in a position which allows only a small stream of material to be conveyed to the bag.

Figure 11 shows both traps in closed position after completion of the weighing operation.

The operation of the device is as follows:

The inner trap 1 is held in open position by a roller attached thereto which roller, engages a recess of the lever 40. The surface of said recess being so designed that, in spite of the weight of this trap, the lever 40 may be pressed back even with a very slight force. The lever 40, however, cannot swing back because it is stopped by lever 42. The supporting lever 42 pressed against the lever 40 thus avoiding a condition where the roller of trap 1 would move out of said recess and close the trap upon movement of the scale, and the slight upward movement of the weight dish caused by the influence of weight 44. The lever 42 is lifted so that lever 40 loses its support and is pressed downward by the weight of the trap 1, and the roller, moving out of the recess, swings downwardly in its slide and the trap 1 is closed. The exterior trap 2 which finally cuts off the feed, operates in exactly the same way. A roller attached to the trap 2 engages a recess in the lever 41 which is supported by lever 43, the lever 43 being so situated that the point where it is engaged by the upward swinging weight dish, is disposed somewhat higher than the corresponding point of lever 42. Thus it is the weight dish on its rising movement, first releases lever 42 and closes the trap 1, as described above, and thereafter when continuing its movement, releases lever 43 and closes trap 2.

I claim:

1. An automatic sacking and weighing machine having a conveying and packing attachment, comprising a gate at the receiving end of the conveyor, a second gate operatively connected to the first gate and disposed at the discharge end of the conveyor to reduce the discharge thereof, and means operatively connecting the weighing mechanism and gates, whereby the second gate is brought into closed position when an approximate balance is attained and the first gate is opened simultaneously to admit further material to reach the conveyor and sacking mechanism to bring about a perfect balance.

2. An automatic device, as claimed in claim 1, in which the packing attachment comprises means for agitating the material after weighing thereof, means for throwing the agitating means into operation subsequent to attaining a perfect balance, and further means for subsequently and automatically disengaging the agitating means.

3. An automatic device, as claimed in claim 1, in which the packing attachment comprises a sack connecting piece normally carried by the balance and into which the second gate opens, means for agitating the material in a sack carried by the connecting piece, means for throwing the agitating means into operation subsequent to attaining a perfect balance, further means for subsequently and automatically disengaging the agitating means, and further locking means comprising a lever to lift the connecting piece in fixed position when the sack has received its charge and the agitating means is operating, a hook swinging with the second gate to engage and hold the connecting piece in raised position free of the balance when the second gate is closed, and means to manually or automatically disconnect the hook and release the connecting piece.

4. An automatic device, as claimed in claim 1, in which the packing attachment comprises means for agitating the material after weighing thereof, means for throwing the agitating means into operation subsequent to attaining a perfect balance, and further means for subsequently and automatically disengaging the agitating means, said agitating means comprising a pair of pivoted packing arms embracing the space containing a sack depending from the sacking mechanism and having free end portions to intermittently engage the sides of the sack, means for driving the arms and an eccentrically disposed weight to maintain the arms in neutral position.

5. An automatic device, as claimed in claim 1, in which the packing attachment comprises means for agitating the material after weighing thereof, means for throwing the agitating means into operation subsequent to attaining a perfect balance, and further means for subsequently and automatically disengaging the agitating means, said agitating means comprising a pair of pivoted packing arms embracing the space containing a sack depending from the sacking mechanism and having free end portions to intermittently engage the sides of the sack, means for driving the arms, an eccentrically disposed weight to maintain the arms in neutral position and pivotal means for supporting said arms in regulated lateral and upright positions.

6. An automatic device, as claimed in claim 1, including rotary spiral agitating means for keeping the material in motion withheld by the closing of the second gate and for moving said material into a restricted opening in said second gate.

7. An automatic device, as claimed in claim 1, in which the packing attachment comprises oppositely disposed pivotally mounted arms, and paddles adjustably mounted in the free ends of said arms and operating with the latter to agitate the sides of a sack receiving the material.

8. An automatic device, as claimed in claim 1, in which the packing attachment comprises a pair of reciprocating paddles to alternately attack the sides of the sack, means for driving said paddles, a system of levers operatively associated with the balance to lock and release the latter and the paddles, and a timing arrangement operatively connected with the lever system and the driving means of the paddles to engage and free the balance and disconnect the paddles from their driving means after a predetermined period of operation of said paddles.

9. An automatic device, as claimed in claim 1, in which the packing attachment comprises a pair of reciprocating paddles to alternately attack the sides of the sack, means for driving said paddles, a system of levers operatively associated with the balance to lock and release the latter and the paddles, and a timing arrangement operatively connected with the lever system and the driving means of the paddles to engage and free the balance and disconnect the paddles from their driving means after a predetermined period of operation of said paddles, said timing arrangement comprising an upright bar movable into position to engage a portion of said lever system and to move the latter free of said balance, an adjustable stop on said bar to limit its upright movement with respect to the portion of the lever system to be engaged, a clutch mechanism operating said bar and driven from said paddle driving mechanism, and means operated by the movement of said lever system to engage and disengage said clutch.

10. In a timing mechanism for an automatic sacking and weighing machine of the character described, the combination of a balance locking member, and means for disengaging the same, comprising an upright rack having an adjustable stop to limit the movement thereof, a pinion in mesh with said rack provided with a driven portion of a clutch, a spur gear provided with the driving portion of the clutch, means for driving said spur gear and means for shifting the spur gear to engage and disengage the clutch portions at predetermined intervals.

In testimony whereof I hereunto affix my signature.

PETER STEIMEL.